UNITED STATES PATENT OFFICE.

LUDWIG HELD, OF BROOKLYN, NEW YORK.

IMPROVEMENT IN FACTITIOUS IVORY.

Specification forming part of Letters Patent No. 17,931, dated August 4, 1857.

*To all whom it may concern:*

Be it known that I, LUDWIG HELD, of the city of Brooklyn, county of Kings, in the State of New York, have invented a new and improved plastic compound which may be used and applied for various purposes as a substitute to the natural ivory, and which I call "artificial ivory;" and I declare that the following is a full and exact description of the mode of preparing and using this compound.

I prepare crude cartilage or chondrin by digesting firmly-ground bones or ivory dust with about one-half of its weight of common chlorohydric acid till the jelly-like appearance of the mass indicates that the inorganic constituents of the bony substance are decomposed; or I prepare vegetable fiber in the finest possible comminution by grinding wood, straw, or the solid parts of any plant. Either of these organic substances—the animal as well as the vegetable—may be used to the same effect in the subsequently-described operations. I further prepare a solution of chloride of zinc of 60° to 65° Baumé strength, and digest it with oxide of zinc in the proportion of one part of the latter to two parts of the dry chloride contained in the solution. This preparation may be considered as a basic chloride of zinc. It is to be heated to about 95° Fahrenheit, and so much of the cartilaginous or vegetable matter is added as will form with it a thick doughy mass, which must be well stirred till it is rendered perfectly homogeneous. Then I add to the mass finely-powdered bleached shellac or gum-copal and mix and knead the whole well together, keeping the temperature constantly to about 95° Fahrenheit. It very soon becomes stiff and hard, and the temperature must be elevated till the shellac or gum-copal is fused, when it is stirred and kneaded anew, till it assumes a nearly uniform appearance; but for rendering it perfectly homogeneous it is to be rolled, like india-rubber, between hot calenders, the sheets formed folded up and rolled out again till it is perfectly uniform throughout. It is now ready to be pressed in hot metallic molds to the desired shape, which it will retain after cooling. The compound so prepared presents a very hard white mass resembling ivory so much that it may be used instead of this precious material for a great many articles, as billiard-balls, cane handles or heads, knife-handles, piano-keys, and for many other useful and ornamental purposes. The facility with which it can be brought to the desired shape by pressing in hot molds, its unalterable color and its power to resist the warping by moisture, and the acids will give it even a certain superiority over the natural ivory.

Instead of chlorohydric any other acid able to decompose bones may be used in preparing the cartilaginous substance, if this is not dissolved or destroyed by the action of such acid. Of ivory the supply may be obtained from the almost useless shavings and other waste of the ivory-cutters. Of bones, I prefer the hard bones of cattle and sheep, well cleaned of flesh, fat, or marrow previous to their treatment. An accurate separation of the salts produced by the action of the acid on the inorganic parts of the bones I found not necessary; but a large excess of acid should be avoided, and it is easy to ascertain the proper quantity from analysis. The finely-divided vegetable fiber has, as I have ascertained, the very same effect in the preparation of the compound as the cartilaginous matter, and it may be used either alone or mixed in any proportion with the latter.

The product obtained from a combination of cartilage or vegetable fiber with the basic chloride of zinc appears to be not merely a mechanical mixture, but a real chemical compound, for when left to itself it sets very quickly to a dry, very hard, and brittle mass, and the salts of zinc generally have a great tendency to combine chemically with organic substances.

Instead of shellac or gum-copal, also, other gum-resins may be applied. Likewise, india-rubber or bleached gutta-percha may be used advantageously if a great elasticity is required. These substances seem to act like a cement, and are of great importance for imparting strength and tenacity to the compound.

If it is intended to produce a compound of a very pure white color, zinc-white or magnesia usta may be used as pigments, and added in such quantity as suits the purpose. If at the same time a great specific gravity is necessary, the white lead or sulphate of barytes are preferable, and generally any desired color and specific gravity may be given by incorporating with the compound while in a hot and soft state mineral or metallic pigments.

The proportions in which the principal constituents of this compound are to be mixed may be varied according to the purpose for which it is intended to be used. I generally use eight parts of the gum to six parts of cartilage or vegetable fiber, and to three or three and one-half parts of the basic chloride of zinc, for a very hard mass. For a more soft elastic mass I use rubber in like proportion as hard gums or a mixture of hard gums and rubber, according to the degree of elasticity and tenacity required. If during the working and heating the mass should become too hard and unmanageable, it may be thinned and softened with a little Venetian turpentine, or such liquid as acts as a solvent for the gum which has been use for the composition.

I do not exactly confine myself to any of the proportions of materials mentioned above, nor to any of the gums herein enumerated; and I do not claim the combining resinous substances or gums with bone or ivory powder, and with metallic oxides, as has been, to my knowledge, prescribed for plastic compounds resembling ivory; but

What I claim as my invention, and desire to secure by Letters Patent, is—

The ivory-like plastic compound produced principally by a combination of cartilaginous substance or vegetable fiber with basic chloride of zinc and gum-resins, prepared and applied in the manner substantially as described above.

LUDWIG HELD.

Witnesses:
FR. KÖNIG,
F. B. WAKEMAN.